US011959446B2

(12) United States Patent
Kazour et al.

(10) Patent No.: US 11,959,446 B2
(45) Date of Patent: Apr. 16, 2024

(54) FLUID INJECTOR HAVING A DIRECTOR PLATE AND A DIRECTOR PLATE RETAINER

(71) Applicant: DELPHI TECHNOLOGIES IP LIMITED, St. Michael (BB)

(72) Inventors: Youssef Kazour, Pittsford, NY (US); Cheng Yang, Shanghai (CN); Geoffrey J. Scott, Fairport, NY (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 26 days.

(21) Appl. No.: 17/407,292

(22) Filed: Aug. 20, 2021

(65) Prior Publication Data

US 2023/0059308 A1 Feb. 23, 2023

(51) Int. Cl.
*F02M 61/18* (2006.01)
*F02M 61/04* (2006.01)

(52) U.S. Cl.
CPC ...... *F02M 61/1853* (2013.01); *F02M 61/042* (2013.01); *F02M 61/1886* (2013.01)

(58) Field of Classification Search
CPC ............. F02M 61/1853; F02M 61/042; F02M 61/1886; F02M 61/188; F02M 61/18; F02M 61/186; F02M 2200/8053; F02M 61/167; F02M 61/1806; F02M 61/1846; B05B 1/14; B05B 1/3046
See application file for complete search history.

(56) References Cited

U.S. PATENT DOCUMENTS

| | | | | |
|---|---|---|---|---|
| 5,273,215 | A | 12/1993 | Hans et al. | |
| 5,862,991 | A | 1/1999 | Willke et al. | |
| 5,967,419 | A | 10/1999 | Yamaguchi et al. | |
| 6,390,067 | B1 * | 5/2002 | Haltiner, Jr. | F02M 61/168 123/470 |
| 6,877,678 | B2 | 4/2005 | Xu et al. | |
| 7,389,952 | B2 * | 6/2008 | Dallmeyer | F02M 51/0682 239/585.5 |
| 2002/0053610 | A1 | 5/2002 | Takagi et al. | |
| 2003/0150942 | A1 * | 8/2003 | Xu | F02M 51/0671 239/585.1 |
| 2005/0127209 | A1 | 6/2005 | Phadke et al. | |
| 2007/0131803 | A1 | 6/2007 | Phadke | |
| 2019/0293040 | A1 | 9/2019 | Pobuda et al. | |

* cited by examiner

*Primary Examiner* — Christopher R Dandridge
(74) *Attorney, Agent, or Firm* — WARNER NORCROSS + JUDD LLP

(57) ABSTRACT

A director plate retainer of a fluid injector includes an outer wall which is annular in shape and which extends from an outer wall first end to an outer wall second end and which is centered about an axis. The director plate retainer also includes a lateral wall which is annular in shape and which extends toward the axis from a radially outer extent, which is proximal to the outer wall, to a radially inner extent, which is distal from the outer wall. The director plate retainer also includes an inner wall which is annular in shape and which extends from an inner wall first end, which is proximal to the lateral wall, to an inner wall second end, which is distal from the lateral wall, the inner wall extending along the axis in a direction that is opposite from the outer wall.

5 Claims, 5 Drawing Sheets

FLUID INJECTOR HAVING A DIRECTOR PLATE AND A DIRECTOR PLATE RETAINER

TECHNICAL FIELD OF INVENTION

The present disclosure relates to a fluid injector for injecting a fluid into an atmosphere, and more particularly to a fluid injector with a director plate which shapes and atomizes the fluid emitted from the fluid injector, and even more particularly to such a fluid injector which includes a director plate retainer which retains the director plate to the fluid injector.

BACKGROUND OF INVENTION

Fluid injectors are well known for injecting a fluid into an atmosphere. One well known type of fluid injector is used to inject fuel into an intake passage of an internal combustion engine. In such fluid injectors, it is known to provide a valve seat with a valve seat aperture extending therethrough. A valve member selectively mates with the valve seat in order to block fluid flow through the valve seat aperture. The valve member is also selectively moved away from the valve seat in order to allow fluid flow through the valve seat aperture. Movement of the valve member may be accomplished by a solenoid assembly. In order to shape and atomize the spray of fluid leaving the fluid injector, a director plate is known to be placed downstream of the valve seat. The director plate includes one or more director plate apertures extending therethrough which impart a desired pattern to the fluid as it exits the fluid injector. In one known arrangement as show in U.S. Pat. No. 6,877,678 to Xu et al., the director plate is fixed within a conduit of the fluid injector by a director plate retainer which is fixed within the conduit through an interference fit between an outer periphery of the director plate retainer and an inner periphery of the conduit. In order to provide adequate retention of the director plate retainer, the outer periphery of the director plate retainer includes an annular wall which extends axially toward the outlet end of the fluid injector, thereby increasing surface area contact between the outer periphery of the annular wall of the director plate retainer and the inner periphery of the conduit. However, extension of the annular wall toward the outlet end of the fluid injector increases the axial length of the fluid injector. In another known arrangement as shown in United States Patent Application Publication No. US 2019/0293040 A1 to Pobuda et al., the same director plate retainer design is used as disclosed in Xu et al., however, the director plate retainer is inverted compared to Xu et al. While this inversion of the director plate retainer allows for the fluid injector to be more axially compact, other challenges are introduced. First, the assembly process is more complex because insertion must be controlled to an insertion distance to ensure adequate clamping force is applied to the director plate, but not too much force that would plastically deform the director plate retainer and cause it to interfere with the corner of the director plate. Interference with the corner of the director plate could cause the inner lip of the director plate retainer to lift away from the director plate and cause poor clamping of the director plate to the valve seat which could allow fluid to leak between the director plate and the valve seat. Second, the radiused transition at the central aperture is susceptible to collecting liquid due to surface tension and the collected liquid may subsequently drip which is undesirable in many applications. Third, many such fluid injectors are very small and the tool that is used to press in the director plate retainer during assembly must be very narrow, similar to a knife edge, in order to press only near the outer perimeter of the director plate retainer. The narrow nature of this tool may damage the director plate retainer during assembly of director plate retainer and may also cause the tool to be less durable.

What is needed is a fluid injector and a director plate retainer which minimizes or eliminates one or more of the shortcomings as set forth above.

SUMMARY OF THE INVENTION

Briefly described, the present disclosure provides, a fluid injector for injecting fluid into an atmosphere. The fluid injector includes a conduit having a fluid inlet which communicates fluid into the fluid injector; a valve seat within the conduit downstream of the fluid inlet, the valve seat having a valve seat aperture extending therethrough along an axis, the valve seat also having a valve seat downstream surface which is transverse to the axis; a valve member which is moveable between 1) a closed position which blocks the valve seat aperture, thereby preventing fluid communication through the valve seat aperture and 2) an open position which unblocks the valve seat aperture, thereby allowing fluid communication through the valve seat aperture; a director plate within the conduit and downstream of the valve seat, the director plate having a director plate upstream surface which is transverse to the axis and which faces toward, and is in contact with, the valve seat downstream surface, the director plate also having a director plate downstream surface which is transverse to the axis and which is opposed to the director plate upstream surface, and a director plate outlet aperture which extends through the director plate from the director plate upstream surface to the director plate downstream surface; and a director plate retainer within the conduit such that the director plate retainer retains the director plate within the conduit. The director plate retainer includes a director plate retainer outer wall which is annular in shape such that the director plate is located within, and is circumferentially surrounded by, the director plate retainer outer wall and such that the director plate retainer outer wall extends from an outer wall first end, which is proximal to the fluid inlet, to an outer wall second end which is distal from the fluid inlet; a director plate retainer lateral wall which is annular in shape and which extends toward the axis from a radially outer extent, which is proximal to the director plate retainer outer wall, to a radially inner extent, which is distal from the director plate retainer outer wall; and a director plate retainer inner wall which is annular in shape and which extends from an inner wall first end, which is proximal to the director plate retainer lateral wall, to an inner wall second end which is distal from the director plate retainer lateral wall.

The present disclosure also provides a director plate retainer of a fluid injector, the director plate retainer being configured to retain a director plate of the fluid injector which shapes and atomizes fluid exiting the fluid injector. The director plate retainer includes a director plate retainer outer wall which is annular in shape and which extends from an outer wall first end to an outer wall second end and which is centered about an axis; a director plate retainer lateral wall which is annular in shape and which extends toward the axis from a radially outer extent, which is proximal to the director plate retainer outer wall, to a radially inner extent, which is distal from the director plate retainer outer wall; and a director plate retainer inner wall which is annular in shape and which extends from an inner wall first end, which is proximal to the director plate retainer lateral wall, to an inner wall second end, which is distal from the director plate retainer lateral wall, the director plate retainer inner wall extending along the axis in a direction that is opposite from the director plate retainer outer wall.

The fluid injector and director plate retainer disclosed herein allows for axial compactness of the fluid injector while providing both a robust compressive force against the director plate and ease of manufacturing by allowing the director plate to be pressed to a hard stop. Furthermore, the director plate retainer can be pressed into place with a press die that has a large surface area, thereby minimizing the likelihood of damaging the director plate retainer during assembly and prolonging the life of the press die.

BRIEF DESCRIPTION OF DRAWINGS

This invention will be further described with reference to the accompanying drawings in which.

DETAILED DESCRIPTION OF INVENTION

Figure 1:
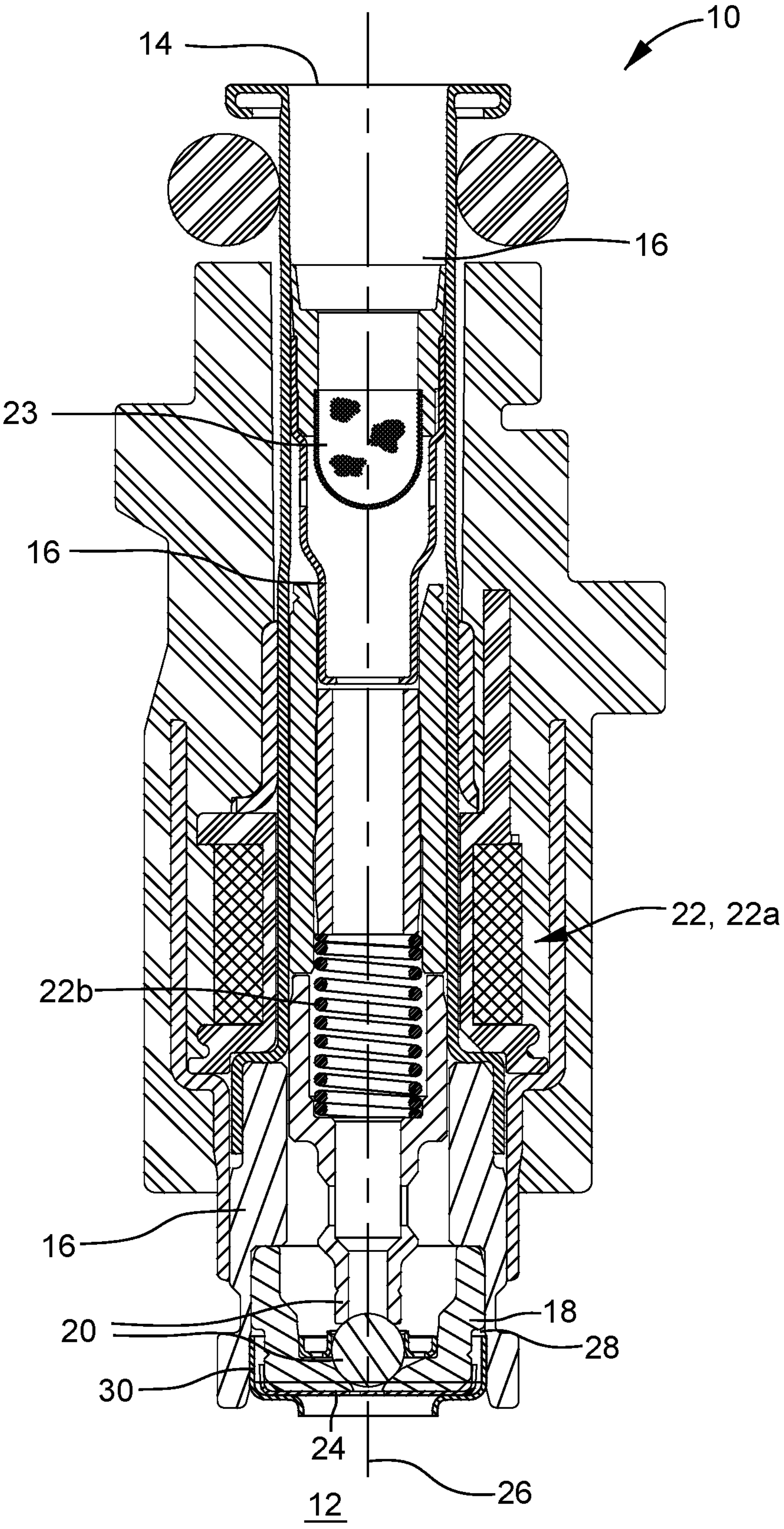
FIG. 1 is an axial cross-sectional view of a fluid injector in accordance with the present invention shown with a valve member in a closed position.
Figure 2:
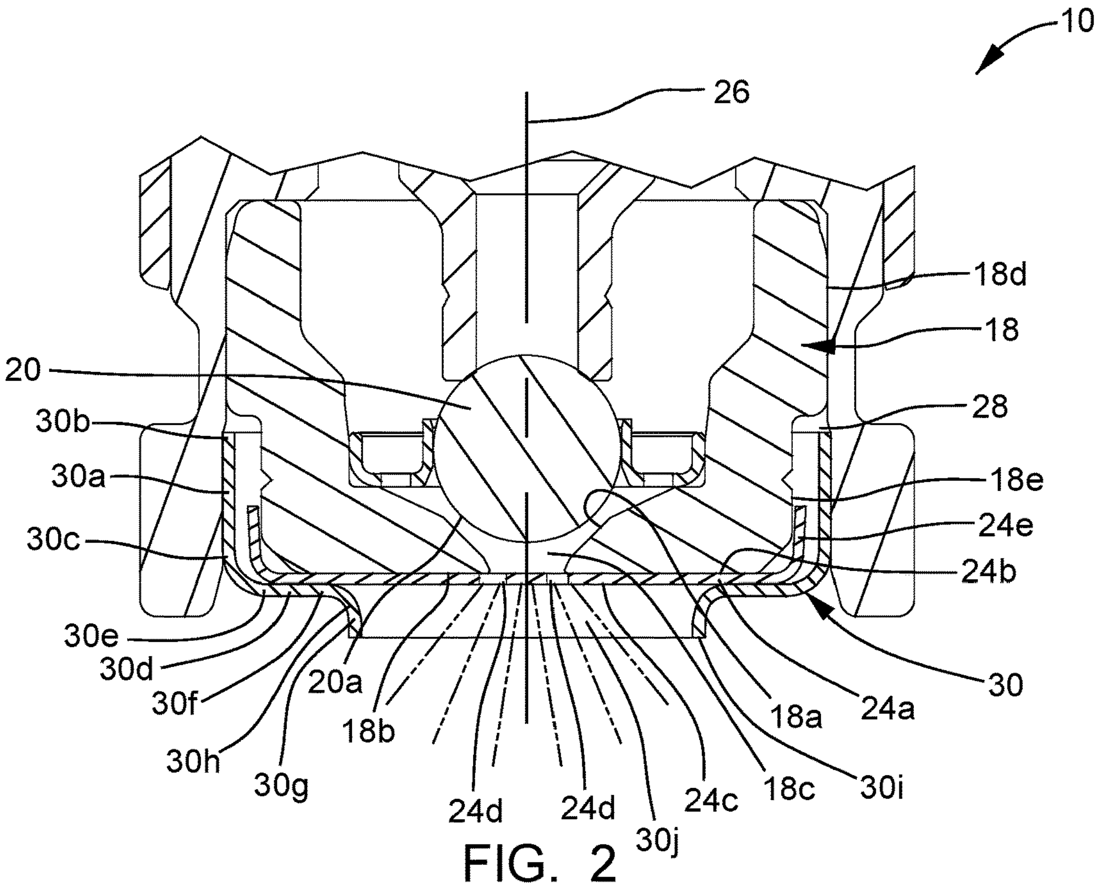
FIG. 2 is a portion of the axial cross-sectional view of the fluid injector of FIG. 1, now shown with the valve member in an open position.
Figure 7:
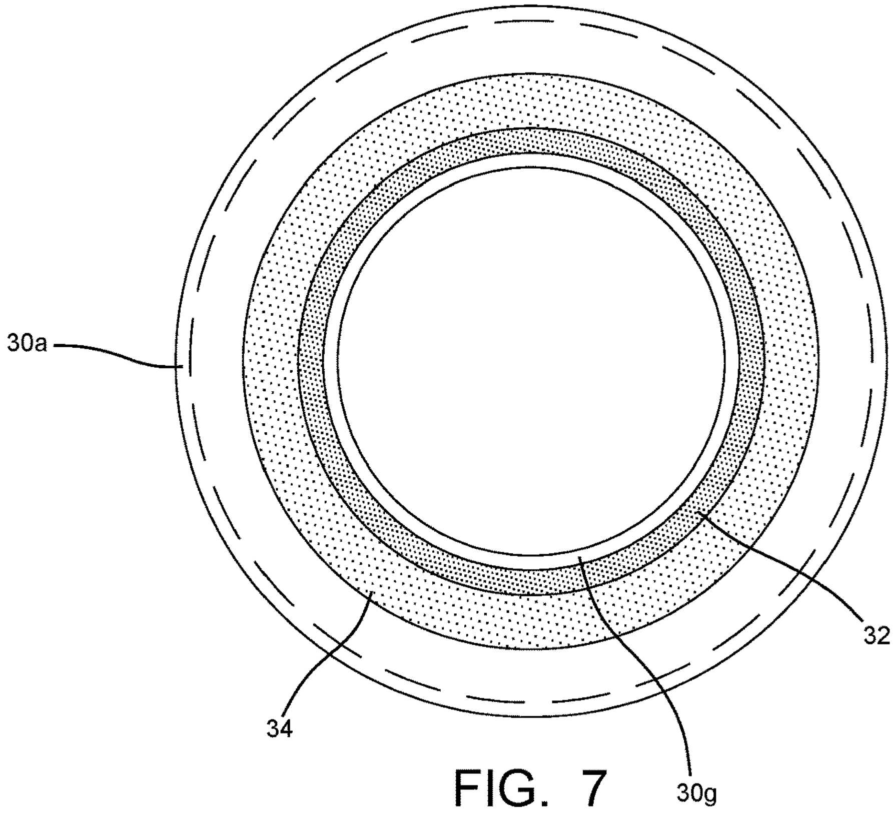
FIG. 7 shows a gradient of compressive force between a director plate and the director plate retainer.

Referring initially to FIGS. 1 and 2, a fluid injector 10 in accordance with the invention is illustrated, where fluid injector 10 is used to inject fluid into an atmosphere 12. While not imparting limitation, fluid injector 10 may be used to inject fuel, for example gasoline, into an intake manifold (not shown) of an internal combustion engine (also not shown). Fluid injector 10 generally includes a fluid inlet 14 which communicates fluid into fluid injector 10, a conduit 16 which is tubular and which receives fluid from fluid inlet 14 where conduit 16 may comprise several individual elements as shown, a valve seat 18 in conduit 16 and downstream of fluid inlet 14, a valve member 20 which is disposed within conduit 16 and which controls flow of fluid through fluid injector 10 by selectively seating and unseating with valve seat 18, an actuator 22 which imparts movement on valve member 20 to seat and unseat valve member 20 with valve seat 18, and a director plate 24 which shapes and atomizes fluid exiting fluid injector 10. A filter 23 may be provided in conduit 16 between fluid inlet 14 and valve seat 18 in order to prevent foreign matter that may be present in fluid entering fluid inlet 14 from reaching valve seat 18 and passing through fluid injector 10.

Valve seat 18 includes a valve seat upstream surface 18*a* which is proximal to fluid inlet 14 and a valve seat downstream surface 18*b* which is distal from fluid inlet 14. A valve seat aperture 18*c* extends through valve seat 18, thereby joining valve seat upstream surface 18*a* and valve seat downstream surface 18*b* such that valve seat aperture 18*c* is centered about, and extends through valve seat 18 along an axis 26. As shown, valve seat upstream surface 18*a* may be a surface of revolution, and may include discrete sections that are each frustoconical and centered about axis 26. Also as shown, valve seat downstream surface 18*b* is transverse to axis 26 and may be planar and perpendicular to axis 26. Valve member 20 includes a valve member surface 20*a* which is configured to provide sealing between valve member surface 20*a* and valve seat upstream surface 18*a* of valve seat 18 when valve member 20 is seated with valve seat 18. As shown, valve member surface 20*a* may be spherical. The outer periphery of valve seat 18 may be stepped in diameter such that an upper portion 18*d* thereof, which is proximal to fluid inlet 14, contacts the inner periphery of conduit 16 in order to provide lateral positioning of valve seat 18 within conduit 16 while a lower portion 18*e* thereof, which is distal from fluid inlet 14, is smaller in diameter than upper portion 18*d* such that an annular gap 28 is formed radially between lower portion 18*e* and the inner periphery of conduit 16. While an enabling embodiment of valve seat 18 and valve member 20 have been provided herein, it will be well understood to a person of ordinary skill in the art of fluid injectors that numerous other geometries may be provided which allow for positive sealing between valve seat 18 and valve member 20.

As illustrated herein actuator 22 may comprise a solenoid 22*a* and a return spring 22*b*. When actuator 22 is energized, a magnetic field is generated which attracts valve member 20, thereby moving valve member 20 upward to an open position as shown in FIG. 2 which unblocks, and allows fluid communication through, valve seat aperture 18*c*. Conversely, when actuator 22 is de-energized, the magnetic field ceases, thereby allowing return spring 22*b* to move valve member 20 downward to a closed position as shown in FIG. 1 which blocks and prevents fluid communication through valve seat aperture 18*c*. In this way, valve member 20 is moveable between the closed position and the open position to precisely time when fluid is discharged from fluid injector 10. Solenoids, their individual elements, and their operation are well known to a person of ordinary skill in the art of fluid injection valves, and consequently, actuator 22 will not be described in greater detail herein. Furthermore, while actuator 22 has been illustrated as including solenoid 22*a* and return spring 22*b*, it will be well understood to a person of ordinary skill in the art of fluid injectors that other actuators may alternatively be used, and may be, by way of non-limiting example only, hydraulic actuators, piezoelectric actuators, and the like or combinations thereof.

As described above, seating and unseating of valve member 20 with valve seat 18 controls flow of fluid through valve seat aperture 18*c*. Consequently, valve member 20 and valve seat 18 are used to time when fluid is discharged from fluid injector 10. In order to control the shape of the fluid that is discharged from fluid injector 10 and to atomize the fluid that is discharged from fluid injector 10, director plate 24 is provided downstream of valve seat 18 which receives fluid from valve seat aperture 18*c* such that features are formed in one or both of valve seat 18 and director plate 24 which provide shaping and atomization. Director plate 24 includes a director plate central portion 24*a* which is disk-shaped and which includes a director plate upstream surface 24*b* which is transverse to axis 26 and which faces toward, and is contact with, valve seat downstream surface 18*b*. Director plate central portion 24*a* also includes a director plate downstream surface 24*c* which is transverse to axis 26 and which is opposed to director plate upstream surface 24*b*. One or more director plate outlet apertures 24*d* extend through director plate central portion 24*a* from director plate upstream surface 24*b* to director plate downstream surface 24*c*. The quantity and specific geometries of director plate outlet apertures 24*d* are selected to achieve the application-specific spray characteristics for the discharge of fluid from fluid injector 10 and will not be described in greater detail herein. Director plate 24 also includes a director plate annular wall 24*e* which extends from the outer periphery of director plate central portion 24*a* into annular gap 28 in a direction toward fluid inlet 14 such that director plate annular wall 24*e* circumferentially surrounds a portion of lower portion 18*e* of valve seat 18, thereby centering director plate 24 about axis 26. Director plate central portion 24*a* and director plate annular wall 24*e* are a continuous, single piece of metal which are integrally formed from a single piece of sheet metal, for example, in a metal stamping operation. While director plate 24 has been embodied herein as a single layer, it should be understood that two or more layers may be provided to collectively form director plate 24.

With continued reference to FIGS. 1 and 2 and now with additional reference to FIGS. 3-7, a director plate retainer 30 is provided within conduit 16 in order to retain director plate 24 within conduit 16. Director plate retainer 30 includes a director plate retainer outer wall 30*a* which is cylindrical and annular in shape such that director plate retainer outer wall 30*a* is centered about axis 26. The outer periphery of director plate retainer outer wall 30*a* engages the inner periphery of conduit 16 in an interference fit which retains director plate retainer 30 within conduit 16. Director plate retainer outer wall 30*a* extends from an outer wall first end 30*b*, which is proximal to fluid inlet 14, to an outer wall second end 30*c*, which is distal from fluid inlet 14 such that director plate retainer outer wall 30*a* extends into annular gap 28. Director plate 24 is located within, and is circumferentially surrounded by, director plate retainer outer wall 30*a*. Similarly, a portion of lower portion 18*e* of valve seat 18 is located within, and is circumferentially surrounded by, director plate retainer outer wall 30*a*. Director plate retainer 30 also includes a director plate retainer lateral wall 30*d* which is annular in shape and which extends inward toward axis 26 from a radially outer extent 30*e*, which is proximal to and intersects with outer wall second end 30*c*. Director plate retainer lateral wall 30*d* extends from radially outer extent 30*e* to a radially inner extent 30*f* which is distal from director plate retainer outer wall 30*a*. Director plate retainer 30 also includes a director plate retainer inner wall 30*g* which is annular in shape and which extends from an inner wall first end 30*h*, which is proximal to fluid inlet 14 and intersects with director plate retainer lateral wall 30*d*, to an inner wall second end 30*i*, which is distal from fluid inlet 14. Director plate retainer inner wall 30*g* creates a director plate retainer central aperture 30*j* which is centered about axis 26, thereby providing a path for fluid passing through director plate outlet apertures 24*d* to pass through director plate retainer 30. As can be seen in the figures, director plate retainer inner wall 30*g* extends along axis 26 in a direction that is opposite from director plate retainer outer wall 30*a*, i.e. director plate retainer inner wall 30*g* extends downward along axis 26 while director plate retainer outer wall 30*a* extends upward along axis 26.

Figure 3:
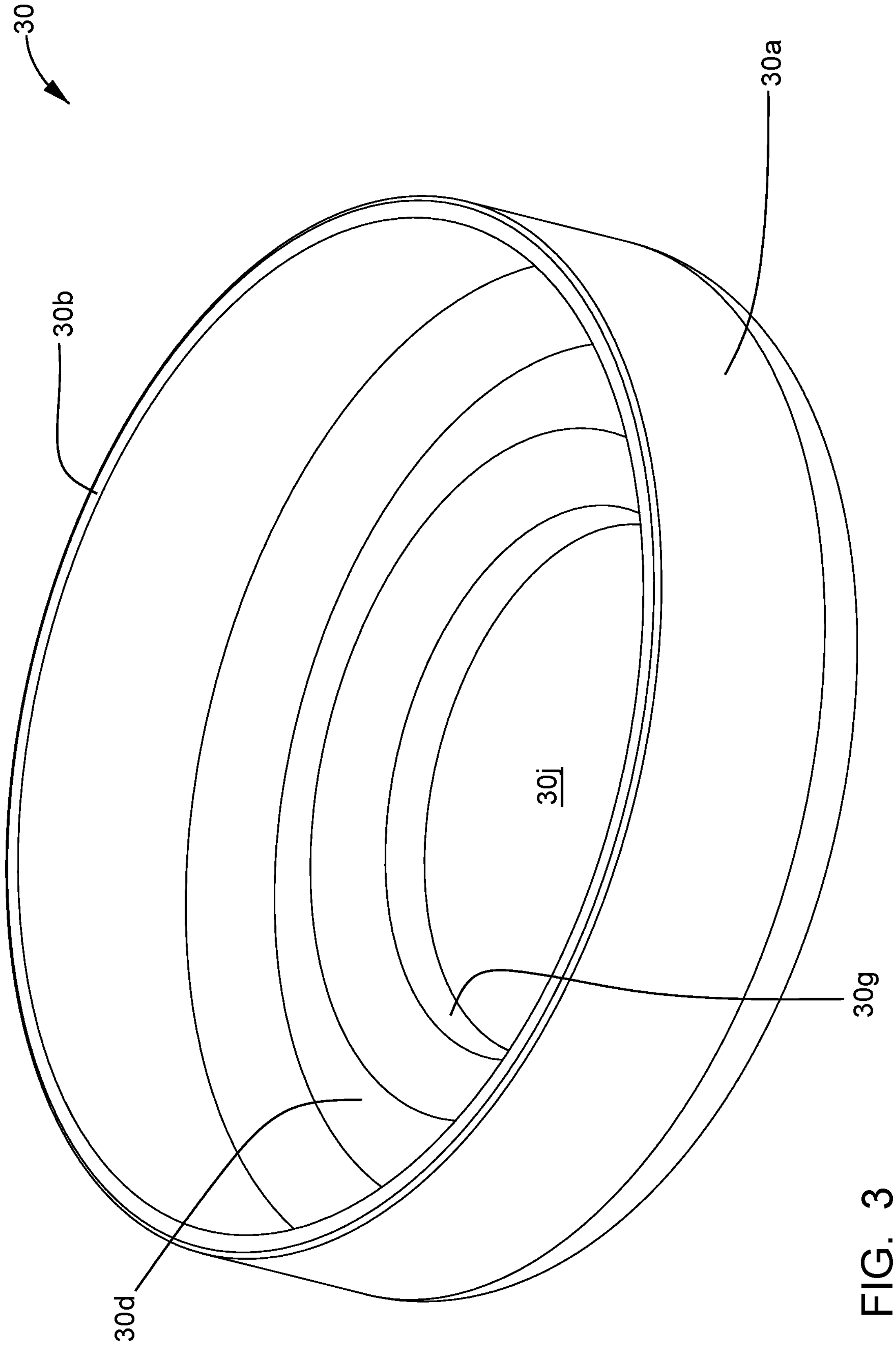
FIG. 3 is an isometric view of a director plate retainer of the fluid injector of FIGS. 1 and 2.
Figure 4:
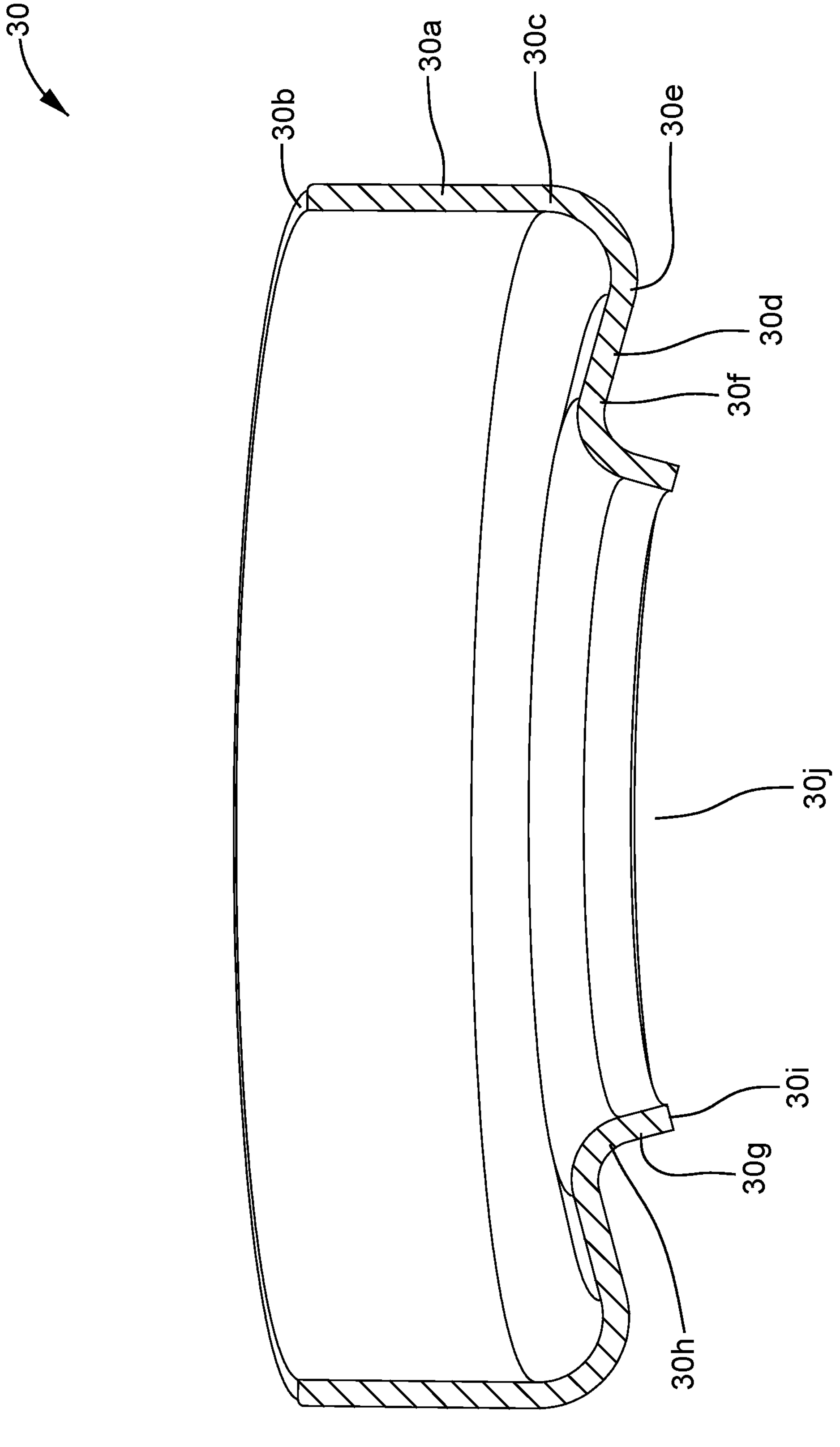
FIG. 4 is an isometric cross-sectional view of the director plate retainer of FIG. 3.
Figure 5:
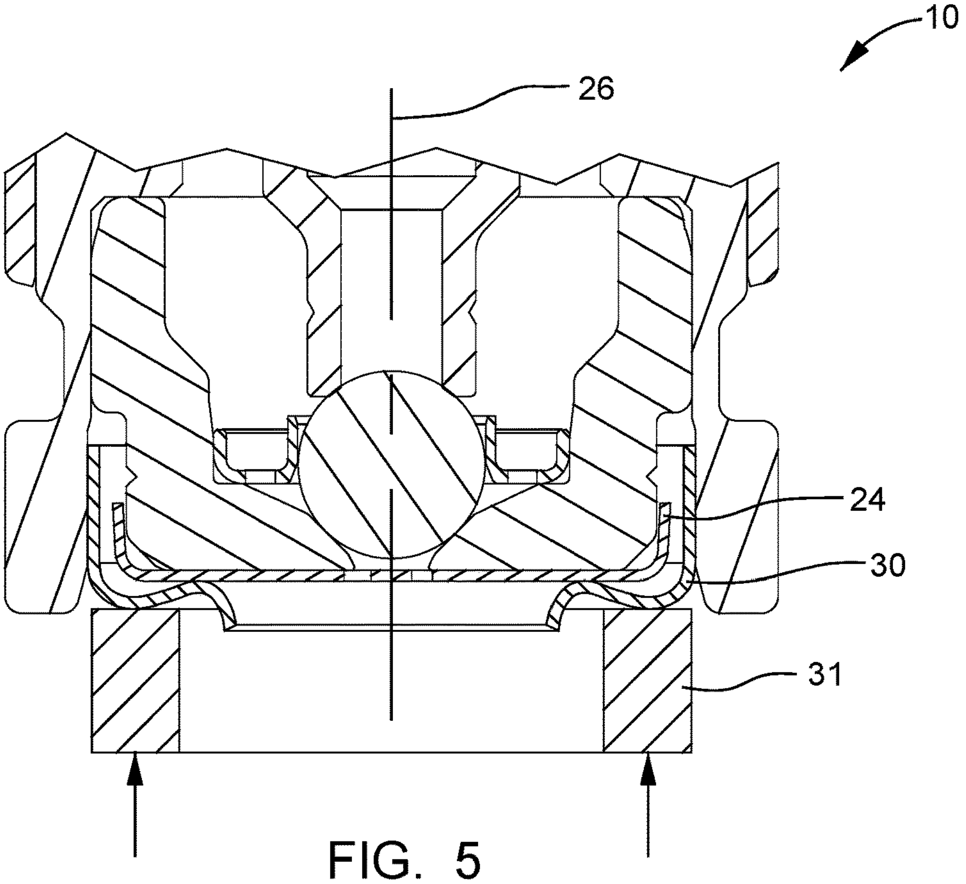
FIGS. 5 and 6 show a progression of installation of the director plate retainer in the fluid injector.
Figure 6:
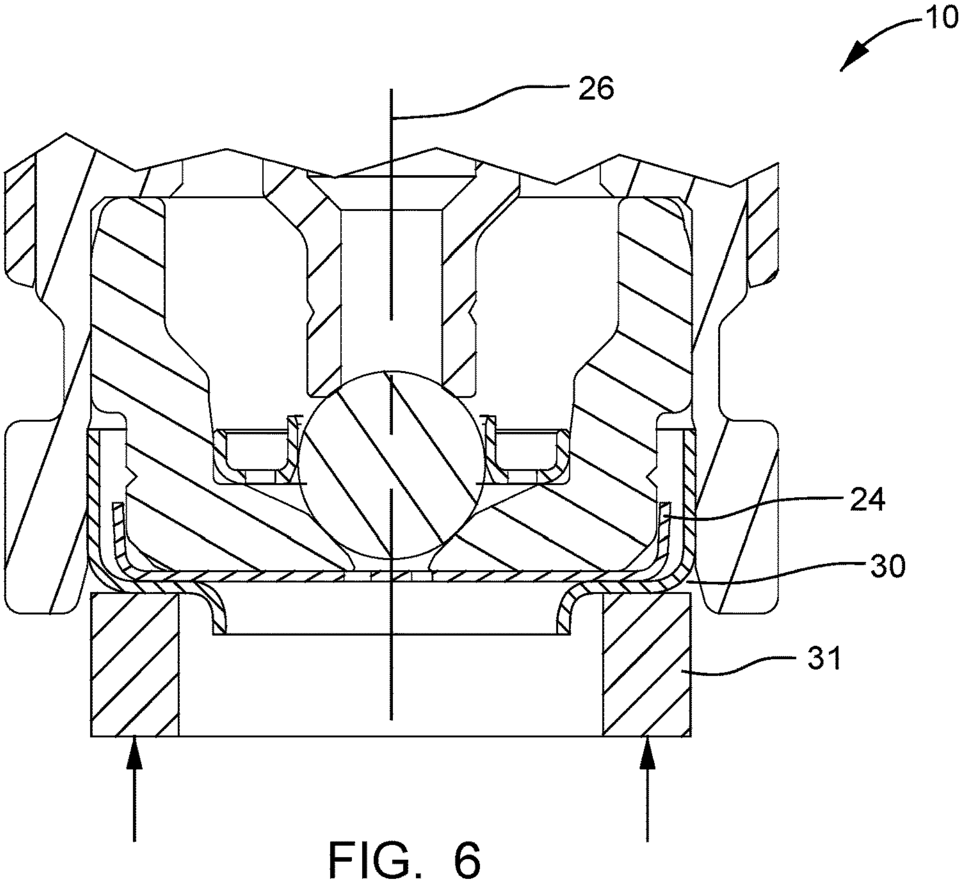

In a free state, i.e. before being fully installed in its final position within conduit 16 as shown in FIGS. 3-5, director plate retainer lateral wall 30*d* is inclined upward toward outer wall first end 30*b*, i.e. when moving in a direction radially inward toward axis 26 director plate retainer lateral wall 30*d* gets closer to outer wall first end 30*b*. In order to provide a proper compressive force on director plate 24, director plate retainer lateral wall 30*d* is inclined relative to perpendicular to axis 26 in a range of 5° to 30°. Consequently, as shown in the figures, at least a portion of director plate retainer lateral wall 30*d* is frustoconical when director plate retainer 30 is in the free state. However, when director plate retainer 30 is pressed into conduit 16, as illustrated in the progression from FIG. 5 to FIG. 6 where press die 31 is shown pressing director plate retainer 30 into position, director plate 24 is first contacted by the intersection of director plate retainer lateral wall 30*d* and director plate retainer inner wall 30*g* as shown in FIG. 5. As director plate retainer 30 is pressed further into conduit 16, director plate retainer lateral wall 30*d* is held in elastic deformation, thereby acting as a spring as shown in FIG. 6. As a result, a compressive force is applied against director plate 24 by director plate retainer 30. Furthermore, the compressive force is applied such that the compressive force is maximized in an annular region 32, illustrated by stippling having a relatively high density in FIG. 7, which is located radially outward from director plate retainer inner wall 30*g* and such that the compressive force decreases, as indicated by stippling having a relatively low density and indicated by reference number 34, radially outward from annular region 32. This gradient in compressive force results from contact with director plate 24 first being made by the intersection of director plate retainer lateral wall 30*d* and director plate retainer inner wall 30*g*. By providing a compressive force in this manner, a better sealing interface between director plate 24 and director plate retainer 30 is achieved and ensures that sealing takes place at a small diameter where fluid forces are lower due to fluid pressure acting on a small area. Furthermore, director plate 24 can be pressed into place until the outer periphery of director plate retainer lateral wall 30*d* abuts director plate 24, i.e. a hard stop, thereby minimizing the risk of deforming director plate retainer 30 during assembly.

Director plate retainer outer wall 30*a*, director plate retainer lateral wall 30*d*, and director plate retainer inner wall 30*g* are a continuous, single piece of metal which are integrally formed from a single piece of sheet metal, for example, in a metal stamping operation.

Fluid injector 10 which includes director plate retainer 30 as described herein allows for axial compactness of fluid injector 10 while providing both a robust compressive force against director plate 24 and ease of manufacturing by allowing director plate 24 to be pressed to a hard stop. Furthermore, director plate retainer 30 can be pressed into place with a press die 31 that has a large surface area, thereby minimizing the likelihood of damaging director plate retainer 30 during assembly and prolonging the life of the press die 31.

While this invention has been described in terms of preferred embodiments thereof, it is not intended to be so limited, but rather only to the extent set forth in the claims that follow.

We claim:

1. A fluid injector for injecting fluid into an atmosphere, said fluid injector comprising:

a conduit having a fluid inlet which communicates a fluid into said fluid injector;

a valve seat within said conduit downstream of said fluid inlet, said valve seat having a valve seat aperture extending therethrough along an axis, said valve seat also having a valve seat downstream surface which is transverse to said axis;

a valve member which is moveable between 1) a closed position which blocks said valve seat aperture, thereby preventing fluid communication through said valve seat aperture and 2) an open position which unblocks said valve seat aperture, thereby allowing fluid communication through said valve seat aperture, wherein said valve member is moveable in a downward direction along said axis to said closed position and moveable in an upward direction along said axis to said open position;

a director plate within said conduit and downstream of said valve seat, said director plate having a director plate upstream surface which is transverse to said axis and which faces toward, and is in contact with, said valve seat downstream surface, said director plate also having a director plate downstream surface which is transverse to said axis and which is opposed to said director plate upstream surface, and a director plate outlet aperture which extends through said director plate from said director plate upstream surface to said director plate downstream surface; and a director plate retainer within said conduit such that said director plate retainer retains said director plate within said conduit, said director plate comprising:

a director plate retainer outer wall which is annular in shape such that said director plate is located within, and is circumferentially surrounded by, said director plate retainer outer wall and such that said director plate retainer outer wall extends from an outer wall first end, which is proximal to said fluid inlet, to an outer wall second end which is distal from said fluid inlet;

a director plate retainer lateral wall which is annular in shape and which extends toward said axis from a radially outer extent, which is proximal to said director plate retainer outer wall, to a radially inner extent, which is distal from said director plate retainer outer wall, said director plate retainer lateral wall having a first surface which faces toward said outer wall first end and said director plate lateral wall also having a second surface which is opposite said first surface and which faces away from said outer wall first end; and a director plate retainer inner wall which is annular in shape and which extends from an inner wall first end, which is proximal to said director plate retainer lateral wall, to an inner wall second end which is distal from said director plate retainer lateral wall such that said inner wall second end is offset in the downward direction from said second surface in a direction parallel to said axis;

wherein said director plate retainer lateral wall applies a compressive force against said director plate such that said compressive force is maximized in an annular region which is located radially outward from said director plate retainer inner wall at an intersection of said director plate retainer inner wall and said director plate retainer lateral wall and such that said compressive force decreases radially outward from said annular region.

2. A fluid injector as in claim 1, wherein a portion of said valve seat is located within, and is circumferentially surrounded by, said director plate retainer outer wall.

3. A fluid injector as in claim 1, wherein said director plate retainer lateral wall is held in elastic deformation.

4. A director plate retainer of a fluid injector, said director plate retainer being configured to retain a director plate of said fluid injector which shapes and atomizes fluid exiting said fluid injector, said director plate retainer comprising:

a director plate retainer outer wall which is annular in shape and which extends from an outer wall first end to an outer wall second end and which is centered about an axis;

a director plate retainer lateral wall which is annular in shape and which extends toward said axis from a radially outer extent, which is proximal to said director plate retainer outer wall, to a radially inner extent, which is distal from said director plate retainer outer wall; and a director plate retainer inner wall which is annular in shape and which extends from an inner wall first end, which is proximal to said director plate retainer lateral wall, to an inner wall second end, which is distal from said director plate retainer lateral wall, said director plate retainer inner wall extending along said axis in a direction that is opposite from said director plate retainer outer wall such that said director plate retainer outer wall extends upwardly from said director plate retainer lateral wall, and said director plate retainer inner wall extends downwardly from said director plate retainer lateral wall;

wherein said director plate retainer lateral wall is inclined relative to said axis such that said radially inner extent is closer to said outer wall first end than said radially outer extent is to said outer wall first end so that an intersection of the director plate retainer lateral wall and the director plate retainer inner wall makes first contact with the director plate when the director plate retainer is installed in the fluid injector.

5. A director plate retainer as in claim 4, wherein said director plate retainer lateral wall is inclined in a range of 5° to 30° relative to perpendicular to said axis.

* * * * *